US012684099B1

(12) United States Patent
Piuze-Phaneuf

(10) Patent No.: US 12,684,099 B1
(45) Date of Patent: Jul. 14, 2026

(54) TRANSITIONING BETWEEN ENVIRONMENTS WITH DIFFERENT PERSPECTIVE CORRECTIONS

(71) Applicant: Apple Inc., Cupertino, CA (US)

(72) Inventor: Emmanuel Piuze-Phaneuf, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 48 days.

(21) Appl. No.: 18/677,335

(22) Filed: May 29, 2024

Related U.S. Application Data

(60) Provisional application No. 63/470,677, filed on Jun. 2, 2023.

(51) Int. Cl.
| *H04N 13/344* | (2018.01) |
| *H04N 13/111* | (2018.01) |
| *H04N 13/383* | (2018.01) |

(52) U.S. Cl.
CPC ......... *H04N 13/111* (2018.05); *H04N 13/383* (2018.05)

(58) Field of Classification Search
CPC .... H04N 13/111; H04N 13/383; G06F 3/013; G02B 27/0093; G06T 19/006
See application file for complete search history.

(56) References Cited

U.S. PATENT DOCUMENTS

| 7,307,655 | B1 * | 12/2007 | Okamoto | G06T 15/10 |
| | | | | 348/222.1 |
| 8,907,983 | B2 * | 12/2014 | McArdle | G06F 3/0481 |
| | | | | 345/635 |
| 9,111,498 | B2 * | 8/2015 | Border | G02B 27/0179 |
| 9,630,105 | B2 * | 4/2017 | Stafford | G06F 3/012 |
| 9,741,169 | B1 * | 8/2017 | Holz | G02B 27/017 |
| 10,019,057 | B2 * | 7/2018 | Osman | G06T 19/006 |
| 10,482,662 | B2 | 11/2019 | Anderson | |
| 10,580,186 | B2 | 3/2020 | Bastide et al. | |
| 11,017,607 | B2 | 5/2021 | Haines | |
| 11,748,953 | B2 * | 9/2023 | Richter | G06F 3/011 |
| | | | | 345/633 |
| 2014/0063058 | A1 * | 3/2014 | Fialho | G06T 19/006 |
| | | | | 345/633 |
| 2024/0046554 | A1 * | 2/2024 | Bai | G06T 15/005 |
| 2024/0212225 | A1 * | 6/2024 | Lin | H04N 21/42202 |

* cited by examiner

*Primary Examiner* — Gims S Philippe
(74) *Attorney, Agent, or Firm* — Fernando & Partners, LLP

(57) ABSTRACT
A method includes presenting a first environment with partial point of view correction (POVC). The method includes determining to transition from the first environment with the partial POVC to a second environment with full POVC. The method includes presenting, for a threshold amount of time, an intermediary environment with intermediate POVC that is a function of the partial POVC and the full POVC. The method includes, after presenting the intermediary environment for the threshold amount of time, transitioning from the intermediary environment with the intermediate POVC to the second environment with the full POVC.

20 Claims, 9 Drawing Sheets

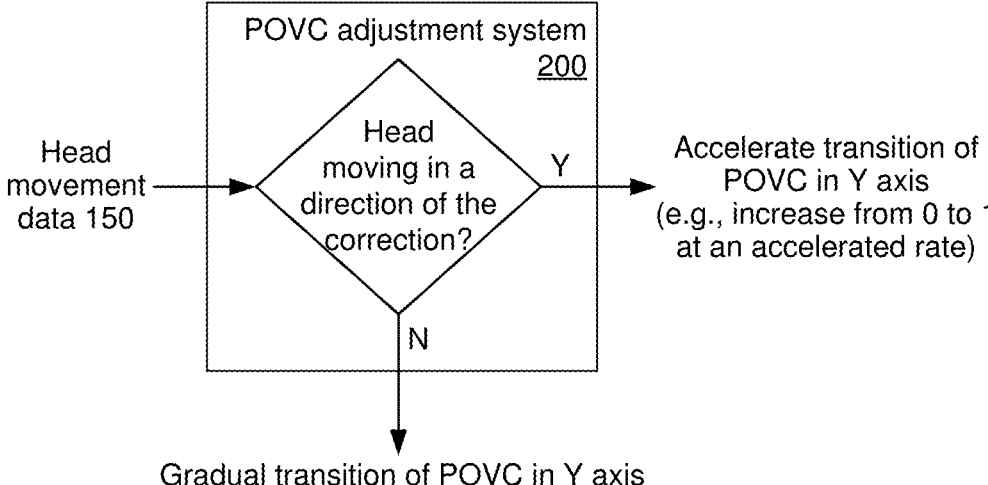

Head movement data 150

POVC adjustment system 200

Head moving in a direction of the correction?

Y → Accelerate transition of POVC in Y axis (e.g., increase from 0 to 1 at an accelerated rate)

N ↓

Gradual transition of POVC in Y axis
(e.g., increase from 0 to 1 at a default rate)

Figure 1F

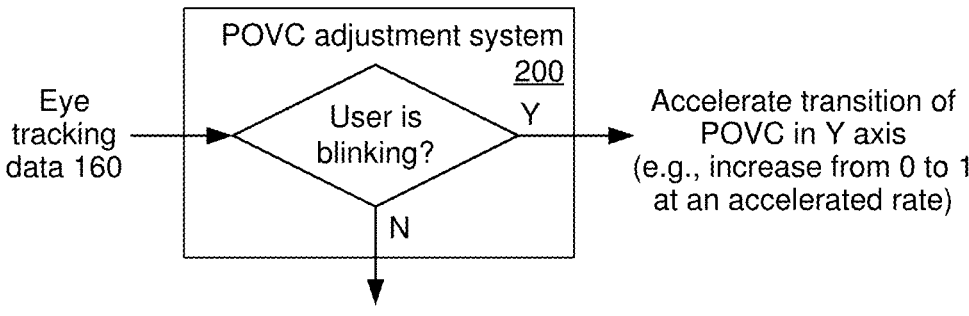

Eye tracking data 160

POVC adjustment system 200

User is blinking?

Y → Accelerate transition of POVC in Y axis (e.g., increase from 0 to 1 at an accelerated rate)

N ↓

Gradual transition of POVC in Y axis
(e.g., increase from 0 to 1 at a default rate)

Figure 1G

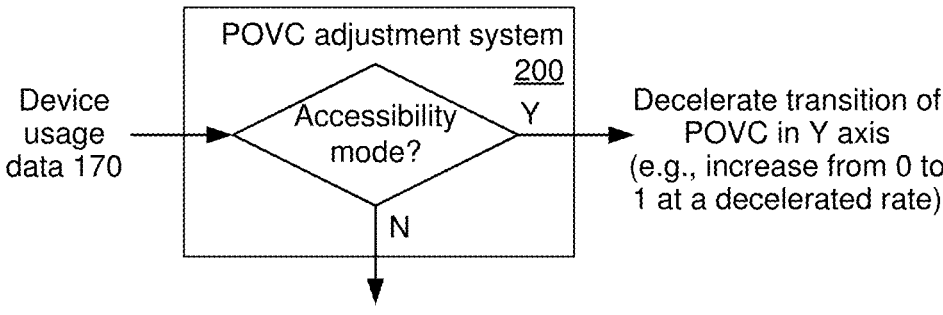

Device usage data 170

POVC adjustment system 200

Accessibility mode?

Y → Decelerate transition of POVC in Y axis (e.g., increase from 0 to 1 at a decelerated rate)

N ↓

Gradual transition of POVC in Y axis
(e.g., increase from 0 to 1 at a default rate)

Figure 3:
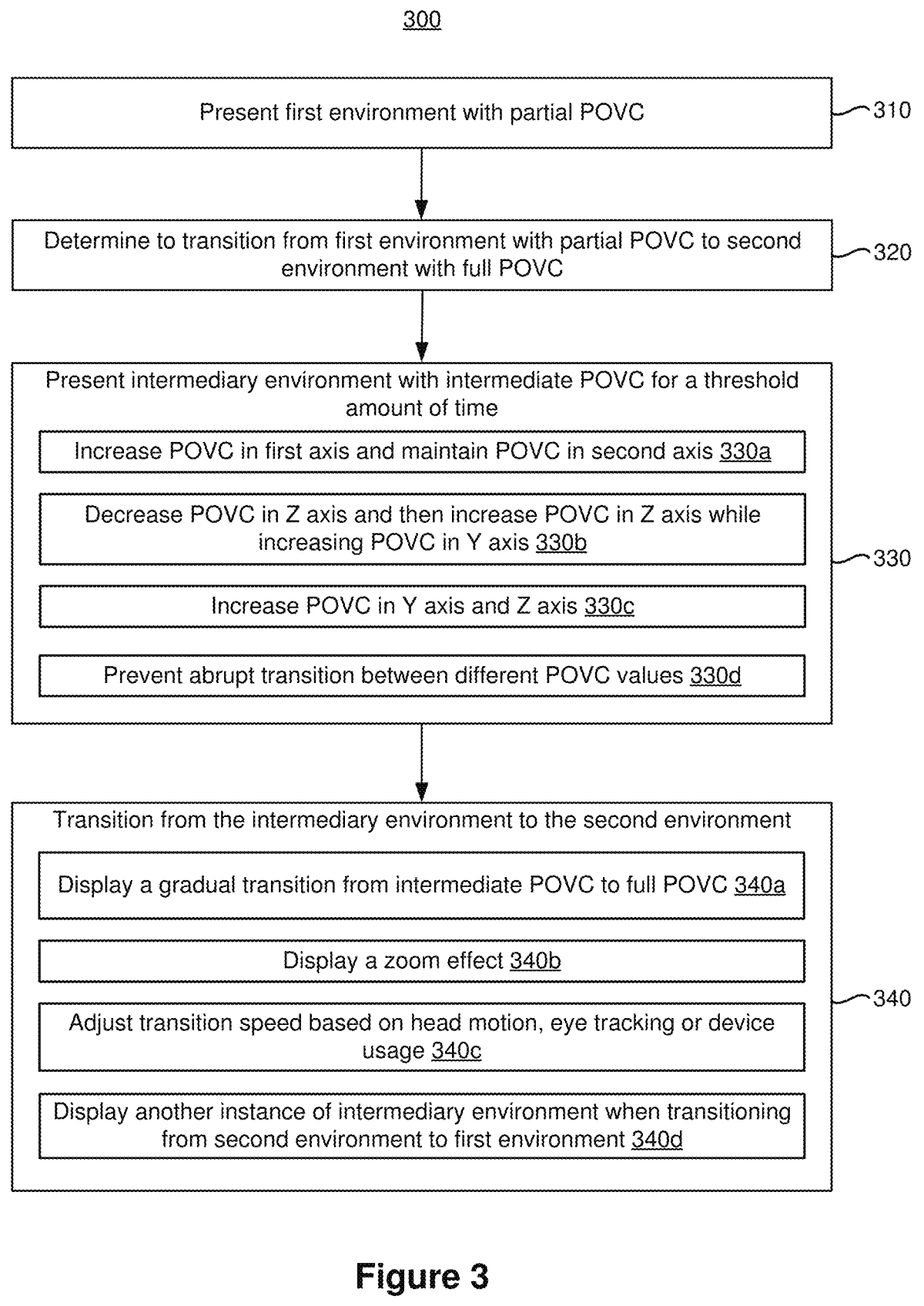

| Present first environment with partial POVC | 310 |

↓

| Determine to transition from first environment with partial POVC to second environment with full POVC | 320 |

↓

Present intermediary environment with intermediate POVC for a threshold amount of time

| Increase POVC in first axis and maintain POVC in second axis 330a |

| Decrease POVC in Z axis and then increase POVC in Z axis while increasing POVC in Y axis 330b |

| Increase POVC in Y axis and Z axis 330c |

| Prevent abrupt transition between different POVC values 330d |

330

↓

Transition from the intermediary environment to the second environment

| Display a gradual transition from intermediate POVC to full POVC 340a |

| Display a zoom effect 340b |

| Adjust transition speed based on head motion, eye tracking or device usage 340c |

| Display another instance of intermediary environment when transitioning from second environment to first environment 340d |

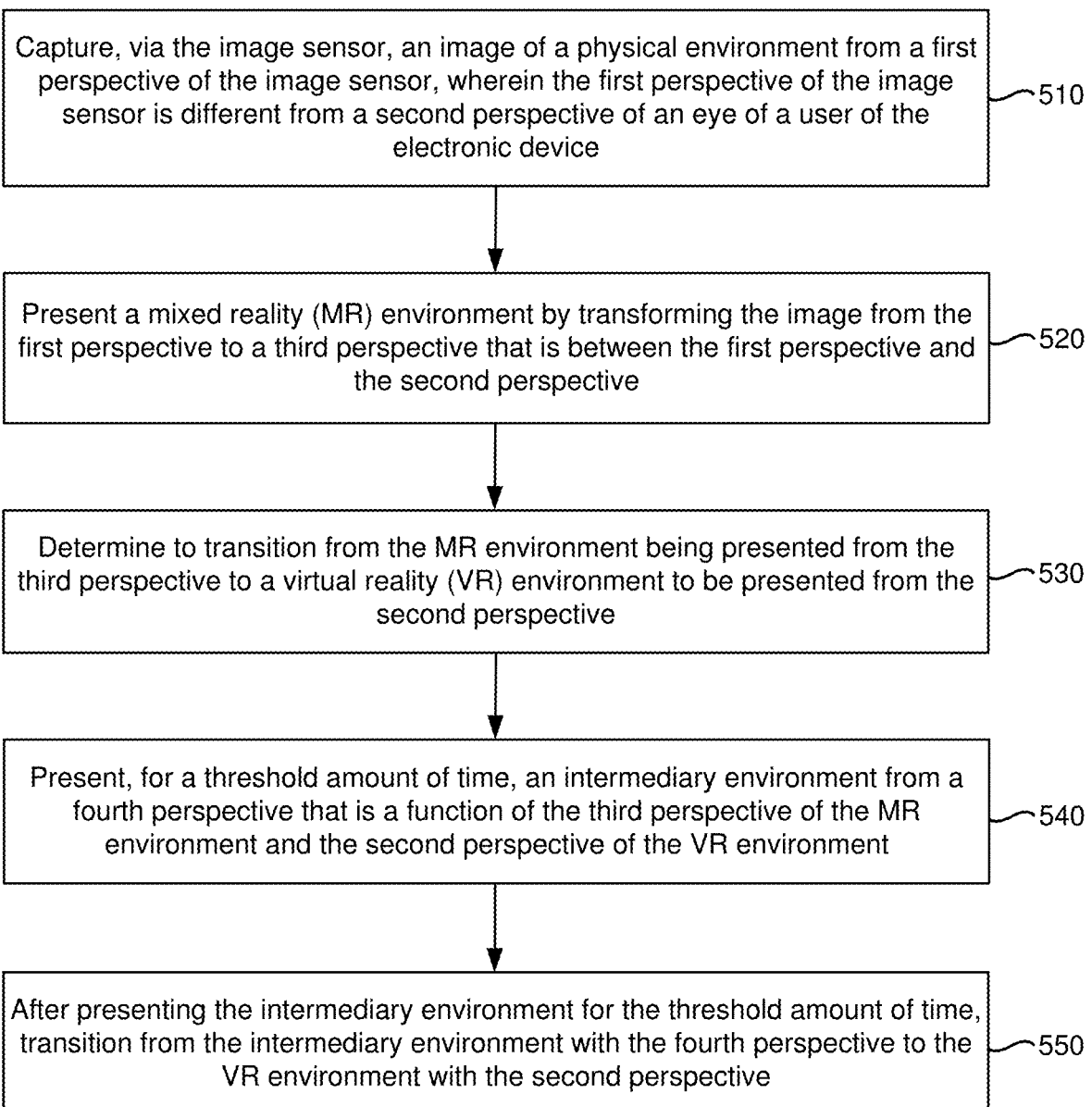

Capture, via the image sensor, an image of a physical environment from a first perspective of the image sensor, wherein the first perspective of the image sensor is different from a second perspective of an eye of a user of the electronic device ⌐510

Present a mixed reality (MR) environment by transforming the image from the first perspective to a third perspective that is between the first perspective and the second perspective ⌐520

Determine to transition from the MR environment being presented from the third perspective to a virtual reality (VR) environment to be presented from the second perspective ⌐530

Present, for a threshold amount of time, an intermediary environment from a fourth perspective that is a function of the third perspective of the MR environment and the second perspective of the VR environment ⌐540

After presenting the intermediary environment for the threshold amount of time, transition from the intermediary environment with the fourth perspective to the VR environment with the second perspective ⌐550

Figure 5

TRANSITIONING BETWEEN ENVIRONMENTS WITH DIFFERENT PERSPECTIVE CORRECTIONS

CROSS-REFERENCE TO RELATED APPLICATION

This application claims the benefit of U.S. Provisional Patent App. No. 63/470,677, filed on Jun. 2, 2023, which is incorporated by reference in its entirety.

TECHNICAL FIELD

The present disclosure generally relates to transitioning between environments with different perspective corrections.

BACKGROUND

Some devices present various types of environments. For example, some devices can present a mixed reality (MR) environment and a virtual reality (VR) environment. Some devices perform point of view correction (POVC) while presenting an environment. A device may perform different perspective corrections while presenting different types of environments. Switching between presentation of different types of environment may include transitioning between different perspective corrections. Transitioning between different perspective corrections can sometimes detract from a user experience provided by the device.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 1F-1H are diagrams illustrating transition adjustments in accordance with some implementations.

FIG. 3 is a flowchart representation of a method of transitioning between environments that are associated with different perspective corrections in accordance with some implementations.

FIG. 5 is a flowchart representation of a method of transitioning between different perspectives in accordance with some implementations.

Figure 1A:
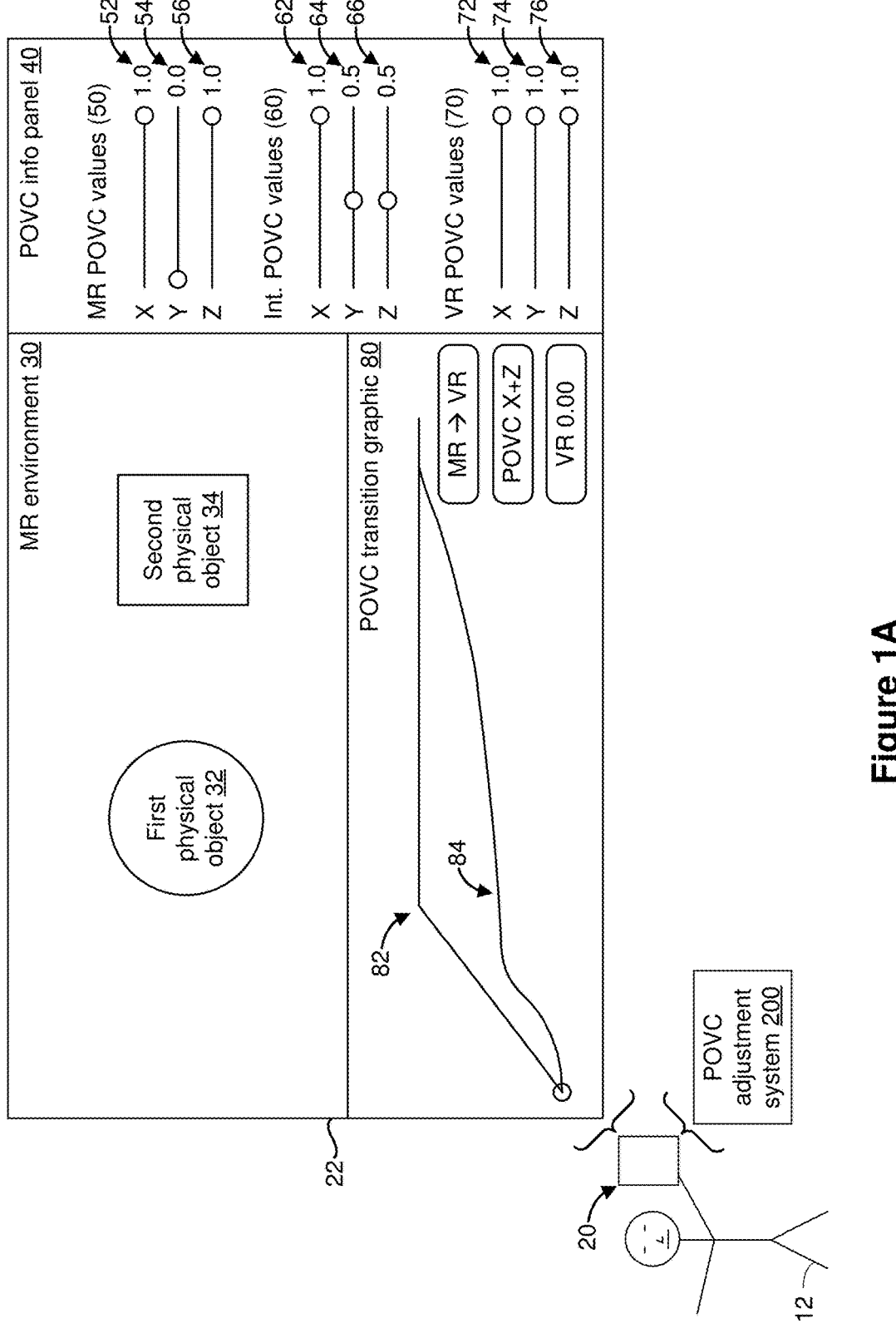
FIGS. 1A-1C are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for transitioning between environments associated with different perspective corrections. In some implementations, a method is performed by an electronic device including a non-transitory memory, one or more processors, a display and an image sensor. In various implementations, a method includes presenting a first environment with partial point of view correction (POVC). In some implementations, the method includes determining to transition from the first environment with the partial POVC to a second environment with full POVC. In some implementations, the method includes presenting, for a threshold amount of time, an intermediary environment with intermediate POVC that is a function of the partial POVC and the full POVC. In some implementations, the method includes, after presenting the intermediary environment for the threshold amount of time, transitioning from the intermediary environment with the intermediate POVC to the second environment with the full POVC.

Various implementations disclosed herein include devices, systems, and methods for transitioning between environments associated with different perspective corrections. In some implementations, a method is performed by an electronic device including a non-transitory memory, one or more processors, a display and an image sensor. In various implementations, a method includes capturing, via the image sensor, an image of a physical environment from a first perspective of the image sensor. In some implementations, the first perspective of the image sensor is different from a second perspective of an eye of a user of the electronic device. In some implementations, the method includes presenting a mixed reality (MR) environment by transforming the image from the first perspective to a third perspective that is between the first perspective and the second perspective. In some implementations, the method includes determining to transition from the MR environment being presented from the third perspective to a virtual reality (VR) environment to be presented from the second perspective. In some implementations, the method includes presenting, for a threshold amount of time, an intermediary environment from a fourth perspective that is a function of the third perspective of the MR environment and the second perspective of the VR environment. In some implementations, the method includes, after presenting the intermediary environment for the threshold amount of time, transitioning from the intermediary environment with the fourth perspective to the VR environment with the second perspective.

In accordance with some implementations, a device includes one or more processors, a plurality of sensors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

When presenting a mixed reality (MR) environment, some devices perform partial point-of-view correction (POVC). For example, when presenting an MR environment, some devices perform full POVC in an X axis, no POVC in a Y axis and full POVC in a Z axis. By contrast, when presenting a virtual reality (VR) environment, some devices perform full POVC in each axis in order to provide a better user experience. For example, when presenting a VR environment, a device may perform full POVC in the X axis, full POVC in the Y axis and full POVC in the Z axis. VR content is typically rendered using a camera that is located at a partial POVC location. Hence, POVC is typically applied in VR. Transitioning from presenting an MR environment with partial POVC to presenting a VR environment with full POVC results in an abrupt change in perspective that is noticeable to the user of the device. For example, transitioning from MR to VR results in transitioning from partial POVC (e.g., full POVC in the X axis, no POVC in the Y axis and full POVC in the Z axis) to full POVC in each axis.

The present disclosure provides methods, systems, and/or devices for transitioning between MR and VR environments while reducing an abrupt change in the POVC being performed. A device reduces an abrupt change in the POVC being performed by masking an abrupt transition in one axis with an intermediate change in another axis. When transitioning from an MR environment with partial POVC to a VR environment with full POVC, the device presents an intermediary environment with intermediate POVC for some time and then gradually transitions from the intermediary environment with intermediate POVC to the VR environment with full POVC. As an example, the device transitions from an MR environment (full X, 0 Y, full Z) to an intermediary environment (full X, 0.5 Y, 0.5 Z). In this example, the device presents the intermediary environment for a threshold amount of time and gradually transitions from the intermediary environment (full X, 0.5 Y, 0.5 Z) to the VR environment (full X, full Y, full Z). The presentation of the intermediary environment masks the abrupt change in the Y axis by introducing an intermediate change in the Z axis. As such, the change in perspective becomes less noticeable to the user.

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes a user 12, an electronic device 20 and a POVC adjustment system 200.

In various implementations, the electronic device 20 includes a display 22 that is capable of presenting various types of environments. In some implementations, the display 22 presents extended reality (XR) environments such as a mixed reality (MR) environment 30 shown in FIG. 1A or a virtual reality (VR) environment. In some implementations, the MR environment 30 includes representations of physical objects that are in the physical environment 10 such as a first physical object 32 and a second physical object 34. In some implementations, the MR environment 30 includes virtual objects (not shown in FIG. 1A). The physical objects 32 and 34 may include inanimate objects such as furniture, buildings, etc. Alternatively or additionally, the physical objects 32 and 34 may represent people. As used herein, an MR environment includes pass-through content (e.g., representations of physical objects in the physical environment of the device) whereas a VR environment does not include pass-through content.

In some implementations, the electronic device 20 is configured to transition from presenting the MR environment 30 to presenting a VR environment. When transitioning from the MR environment 30 to the VR environment, the POVC adjustment system 200 adjusts a level of POVC that is performed on content that is presented via the display 22. In some implementations, a level of POVC refers to whether or not perspective correction is performed with respect to a particular axis. In some implementations, the level of POVC refers to an amount of perspective correction (e.g., a degree of perspective correction, for example, full POVC, partial POVC or no POVC) that is performed in an X axis, a Y axis and a Z axis.

FIG. 1A includes a POVC information panel 40 that illustrates different levels of POVC that the POVC adjustment system 200 applies to content being presented on the display 22 as the electronic device 20 transitions from the MR environment 30 to the VR environment. In the example of FIG. 1A, the POVC adjustment system 200 performs perspective correction in accordance with MR POVC values 50 to the content associated with the MR environment 30. The MR POVC values 50 include an MR X axis POVC value 52 (e.g., 1.0 representative of full POVC in the X axis), an MR Y axis POVC value 54 (e.g., 0.0 representative of no POVC in the Y axis), and an MR Z axis POVC value 56 (e.g., 1.0 representative of full POVC in the Z axis). The MR POVC values 50 may be denoted as full X, 0 Y and full Z for the sake of brevity.

In the example of FIG. 1A, the POVC information panel 40 includes intermediary POVC values 60 for the POVC adjustment system 200 to apply to content associated with an intermediary environment that the electronic device 20 presents when transitioning from the MR environment 30 to a VR environment. The intermediary POVC values 60 include an intermediary X axis POVC value 62 (e.g., 1.0 representative of full POVC in the X axis), an intermediary Y axis POVC value 64 (e.g., 0.5 representative of partial POVC in the Y axis), and an intermediary Z axis POVC value 66 (e.g., 0.5 representative of partial POVC in the Z axis). The intermediary POVC values 60 may be denoted as full X, 0.5 Y and 0.5 Z for the sake of brevity. In the example of FIG. 1A, the intermediary Z axis POVC value 66 is less than the MR Z axis POVC value 56. In various implementations, temporarily reducing the POVC in the Z axis allows the POVC adjustment system 200 to reduce a noticeability of the change in the POVC of the Y axis from 0 to 1. In order words, temporarily reducing the POVC in the Z axis from 1.0 to 0.5 allows the POVC adjustment system 200 to mask the relatively large change in the POVC of the Y axis from 0 to 1. Masking the relatively large change in the POVC of the Y axis tends to reduce a likelihood of the user 12 experiencing dizziness during the transition from the MR environment 30 to the VR environment.

In the example of FIG. 1A, the POVC information panel 40 further includes VR POVC values 70 for the POVC adjustment system 200 to apply to content associated with a VR environment that the electronic device 20 presents when the transition from the MR environment 30 to the VR environment is complete. The VR POVC values 70 include a VR X axis POVC value 72 (e.g., 1.0 representative of full POVC in the X axis), a VR Y axis POVC value 74 (e.g., 1.0 representative of full POVC in the Y axis), and a VR Z axis POVC value 76 (e.g., 1.0 representative of full POVC in the Z axis). The VR POVC values 70 may be denoted as full X, full Y and full Z for the sake of brevity. As illustrated in FIG. 1A, the VR Z axis POVC value 76 of 1.0 results in a restoration of full POVC in the Z axis which was temporarily reduced during the presentation of the intermediary environment. Temporarily reducing the POVC in the Z axis and then increasing the POVC in the Z axis along with the POVC in the Y axis tends to reduce an appearance of a vertical shift in the Y axis. Reducing the noticeability of the Y shift tends to increase a level of comfort that the user 12 experiences when the electronic device 20 transitions between the MR environment 30 and the VR environment.

FIG. 1A illustrates a POVC transition graphic 80 that graphically shows the transition from the MR environment 30 to the VR environment. The POVC transition graphic 80 includes a VR curve 82 that indicates how much of the VR environment is being presented during the transition from the MR environment 30 to the VR environment. In the example of FIG. 1A, the VR curve 82 shows that zero percent of the VR environment is being presented because the electronic device 20 is currently presenting the MR environment 30. The POVC transition graphic 80 further includes a POVC transition curve 84 that shows a change in the level of POVC applied to content being presented via the display 22 during the transition from the MR environment 30 to the VR environment. In the example of FIG. 1A, the POVC transition graphic 80 shows that full POVC is being performed in the X axis and the Z axis while no POVC is being performed in the Y axis.

Figure 1B:
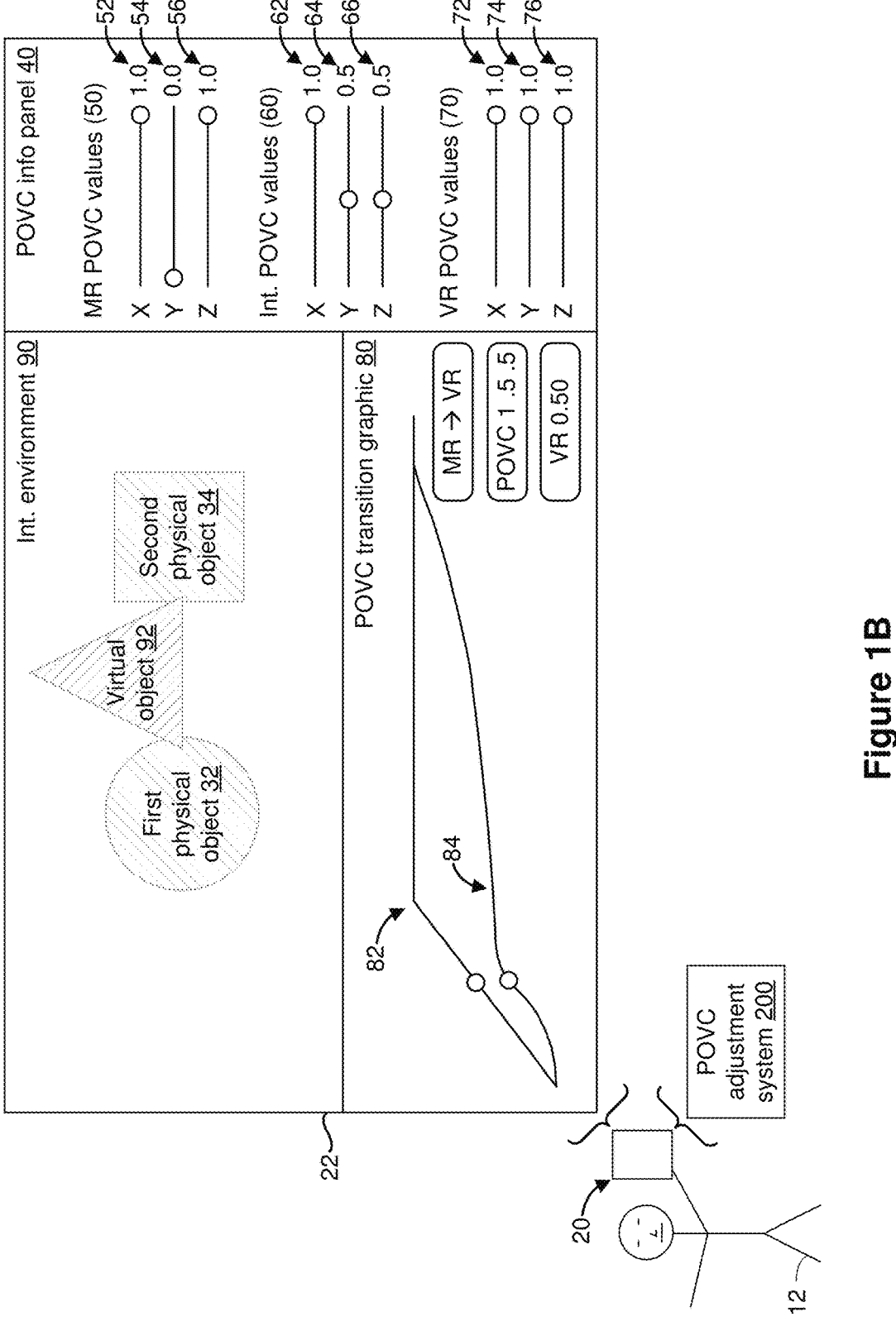

Referring to FIG. 1B, in various implementations, the electronic device 20 determines to transition from displaying the MR environment 30 shown in FIG. 1A to displaying a VR environment. In some implementations, the electronic device 20 obtains a request to transition from the MR environment 30 to the VR environment. For example, in some implementations, the user 12 provides a user input that corresponds to a request to switch to the VR environment.

In various implementations, the electronic device 20 (e.g., the POVC adjustment system 200) presents an intermediary environment 90 in response to determining to transition from the MR environment 30 shown in FIG. 1A to a VR environment. While the electronic device 20 is presenting the intermediary environment 90, the POVC adjustment system 200 performs perspective correction in accordance with the intermediary POVC values 60 to content associated with the intermediary environment 90. In the example of FIG. 1B, the POVC adjustment system 200 increases the POVC in the Y axis from 0 to 0.5 and decreases the POVC in the Z axis from 1 to 0.5 while maintaining the POVC in the X axis at 1.

In some implementations, the POVC adjustment system 200 gradually increases the POVC in the Y axis and the Z axis from 0.5 to 1.0 in order to complete the transition to the VR environment. In some implementations, presenting the intermediary environment 90 includes displaying a fading of the physical objects 32 and 34 (as indicated by the cross-hatching of the physical objects 32 and 34), and displaying a faint appearance of a virtual object 92 that is part of the VR environment (as indicated by the crosshatching of the virtual object 92). As the POVC adjustment system 200 increases the POVC in the Y axis and the Z axis, the physical objects 32 and 34 start to fade away and the virtual object 92 starts to appear from prominent. In the example of FIG. 1B, the VR curve 82 shows that fifty percent of the VR environment is being presented and the POVC transition curve 84 shows that full POVC is being performed in the X axis and partial POVC is being performed in the Y axis and the Z axis.

Figure 1C:
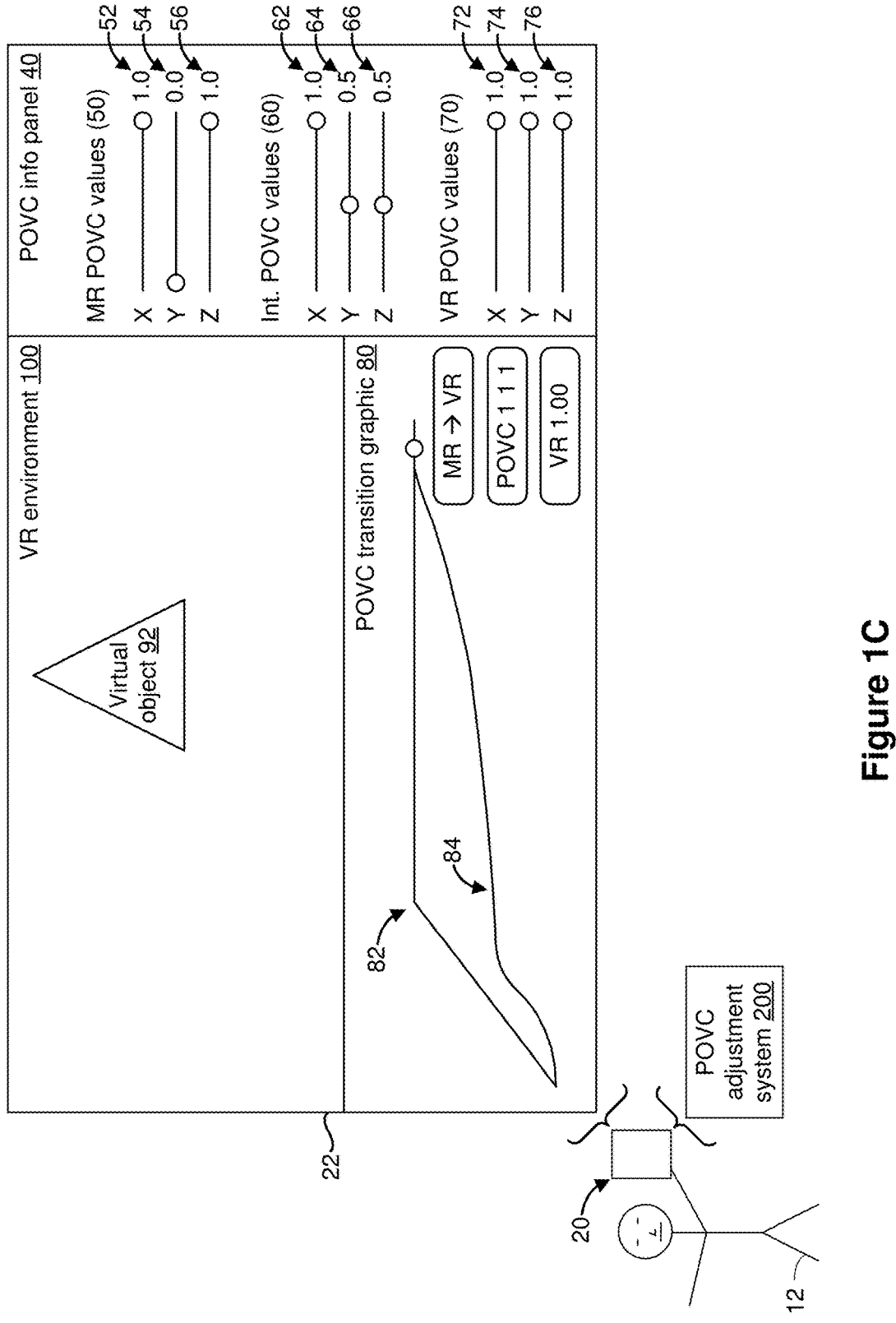

FIG. 1C depicts the electronic device 20 presenting a VR environment 100. The VR environment 100 includes the virtual object 92. In the example of FIG. 1C, the VR curve 82 shows that one hundred percent of the VR environment 100 is being presented. As such, the virtual object 92 does not include crosshatching and the physical objects 32 and 34 are not being displayed. The POVC transition curve 84 shows that full POVC is being performed in the X axis, the Y axis and the Z axis in accordance with the VR POVC values 70. In FIG. 1C, the transition from the MR environment 30 (shown in FIG. 1A) to the VR environment 100 is complete.

Figure 1E:
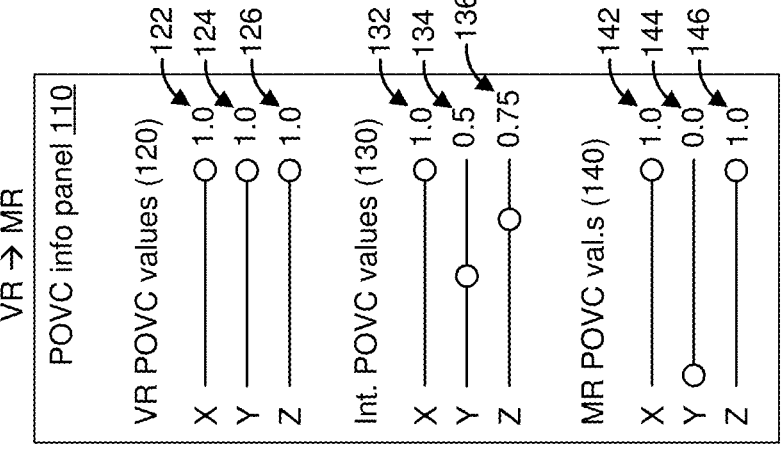
FIGS. 1D and 1E are diagrams illustrating example perspective corrections in accordance with some implementations.
Figure 1D:
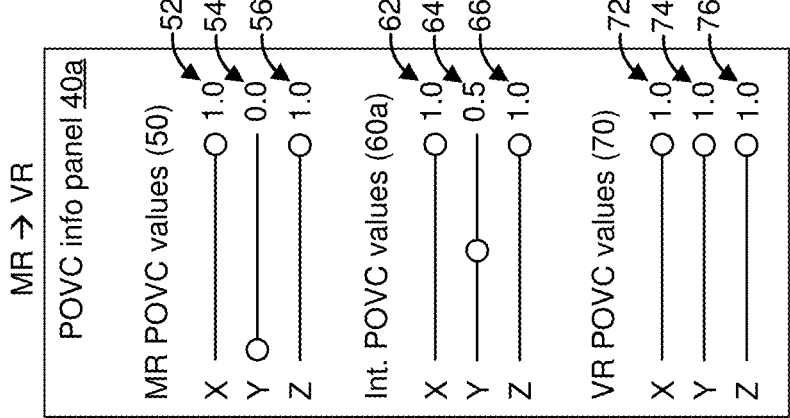

FIG. 1D illustrates another example POVC information panel 40a for transitioning from MR to VR. The POVC information panel 40a includes the MR POVC values 50 and the VR POVC values 70 from the POVC information panel 40 shown in FIGS. 1A-1C. However, the POVC information panel 40a includes intermediary POVC values 60a that are different from the POVC intermediary values 60 shown in FIGS. 1A-1C. In particular, the intermediary POVC values 60a include an intermediary Z axis POVC value 66a (e.g., 1.0 representative of full POVC in the Z axis) that is different from the intermediary Z axis POVC value 66 shown in FIGS. 1A-1C. In some implementations, the POVC adjustment system 200 may not temporarily reduce the POVC in the Z axis in accordance with the intermediary Z axis POVC value 66a.

FIG. 1E illustrates an example POVC information panel 110 for transitioning from VR to MR. The POVC information panel 110 includes VR POVC values 120 (e.g., a VR X axis POVC value 122, a VR Y axis POVC value 124 and a VR Z axis POVC value 126), intermediary POVC values 130 (e.g., an intermediary X axis POVC value 132, an intermediary Y axis POVC value 134 and an intermediary Z axis POVC value 136), and MR POVC values 140 (e.g., an MR X axis POVC value 142, an MR Y axis POVC value 144 and an MR Z axis POVC value 146).

In some implementations, when transitioning from VR to MR, the electronic device 20 displays an intermediary environment similar to the intermediary environment 90 shown in FIG. 1B. The POVC adjustment system 200 performs perspective correction in accordance with the intermediary POVC values 130 to content associated with the intermediary environment. Applying the intermediary POVC values 130 may include temporarily reducing the POVC in the Z axis from full POVC to partial POVC while reducing the POVC in the Y axis. For example, the POVC adjustment system 200 may reduce the POVC in the Z axis from 1.0 to 0.75 in accordance with the intermediary Z axis POVC value 136 while reducing the POVC in the Y axis from 1.0 to 0.5 in accordance with the intermediary Y axis POVC value 134.

After displaying the intermediary environment for a threshold amount of time, the electronic device 20 gradually transitions from the intermediary environment to the MR environment (e.g., from the intermediary environment 90 shown in FIG. 1B to the MR environment 30 shown in FIG. 1A). During the gradual transition from the intermediary environment to the MR environment, the POVC adjustment system 200 gradually reduces the POVC in the Y axis from 0.5 to 1.0 in accordance with the MR Y axis POVC value 144 while restoring the POVC in the Z axis to 1.0 in accordance with the MR Z axis POVC value 146.

FIGS. 1F-1H illustrate adjustments to the gradual transition from the intermediary environment to the VR environment based on contextual data. FIG. 1F illustrates the POVC adjustment system 200 receiving head movement data 150. The head movement data 150 may indicate a direction in which the user 12 is moving his/her head. In some implementations, the POVC adjustment system 200 determines whether the head is moving in a direction of a correction. If the head is moving in the same direction as the correction, the POVC adjustment system 200 accelerates an increase in a level of the POVC in the Y axis. For example, the increase in the POVC of the Y axis from 0 to 1 occurs at an accelerated rate. By contrast, if the head is not moving in the direction of the correction (e.g., if the head is moving in an opposite direction), the POVC adjustment system 200 does not accelerate the increase in the level of the POVC in the Y axis (e.g., the increase from 0 to 1 occurs at a default rate).

FIG. 1G illustrates the POVC adjustment system 200 receiving eye tracking data 160. In some implementations, the POVC adjustment system 200 utilizes the eye tracking data 160 to determine whether the user 12 is blinking (e.g., to determine whether the user's eyes are closed at any given point of time). In some implementations, the POVC adjustment system 200 accelerates an increase in a level of the POVC in the Y axis while the user 12 is blinking (e.g., while the user's eyes are closed). For example, the increase in the POVC of the Y axis from 0 to 1 occurs at an accelerated rate. While the user 12 is blinking, the user 12 is unlikely to notice the accelerated increase in the level of the POVC in the Y axis. Hence, the transition can be accelerated without adversely impacting a user experience provided by the electronic device 20. By contrast, when the user 12 is not blinking, the user 12 may notice significant increases in the level of POVC in the Y axis. As such, while the user 12 is not blinking (e.g., while the user's eyes are open), the POVC adjustment system 200 does not accelerate the increase in the level of the POVC in the Y axis (e.g., the increase from 0 to 1 occurs at a default rate).

FIG. 1H illustrates the POVC adjustment system 200 receiving device usage data 170. In some implementations, the POVC adjustment system 200 utilizes the device usage data 170 to determine whether an accessibility mode has been activated (e.g., whether the user 12 has specifically activated the accessibility mode or whether to automatically activate the accessibility mode based on a detected impairment of the user 12). In some implementations, the POVC adjustment system 200 decelerates an increase in a level of the POVC in the Y axis when the accessibility mode is activated. For example, the increase in the POVC of the Y axis from 0 to 1 occurs at a decelerated rate. A person with an impairment may be more susceptible to the increase in the POVC value in the Y axis (e.g., the person may be more susceptible to feeling discomfort and/or get dizzy more easily). Hence, the transition can be decelerated in order to reduce a likelihood of causing discomfort to the user 12 if the user 12 has an impairment. By contrast, when the accessibility mode is not activated, the POVC adjustment system 200 does not decelerate the increase in the level of the POVC in the Y axis (e.g., the increase from 0 to 1 occurs at a default rate).

Figure 2:
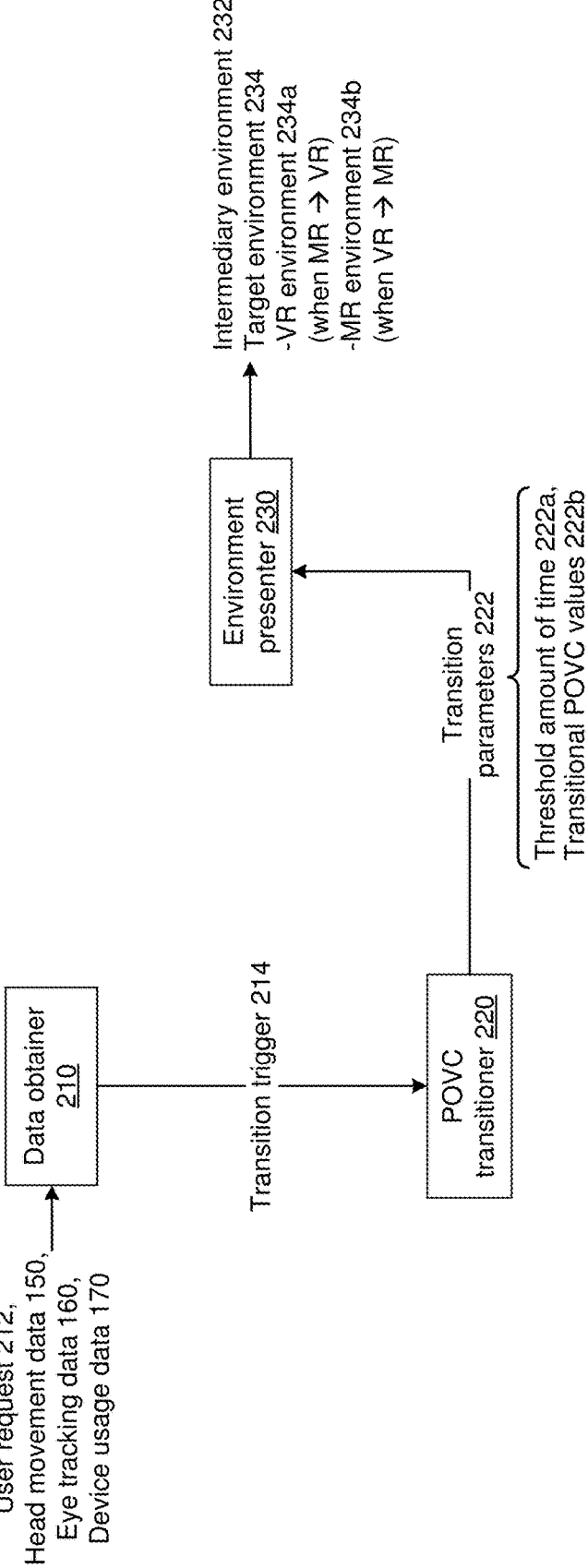
FIG. 2 is a diagram of a POVC adjustment system in accordance with some implementations.

FIG. 2 is a block diagram of the POVC adjustment system 200 in accordance with some implementations. In various implementations, the POVC adjustment system 200 includes a data obtainer 210, a POVC transitioner 220 and an environment presenter 230. In some implementations, the data obtainer 210 obtains a user request 212 to switch from presenting a first type of environment to a second type of environment. For example, the user request 212 may include a request to switch from presenting an MR environment to a VR environment (e.g., a request to transition from the MR environment 30 shown in FIG. 1A to the VR environment 100 shown in FIG. 1C). As another example, the user request 212 may include a request to switch from presenting a VR environment to an MR environment (e.g., a request to transition from the VR environment 100 shown in FIG. 1C to the MR environment 30 shown in FIG. 1A).

In some implementations, the data obtainer 210 obtains contextual data that the POVC adjustment system 200 utilizes to transition between different types of environments. In some implementations, the contextual data includes the head movement data 150 shown in FIG. 1F, the eye tracking data 160 shown in FIG. 1G and/or the device usage data 170 shown in FIG. 1H. In various implementations, a speed at which the transition occurs is a function of the contextual data. For example, in some implementations, a rate at which a level of POVC is increased or decreased in an axis is based on the head movement data 150, the eye tracking data 160 and/or the device usage data 170.

In various implementations, the data obtainer 210 provides a transition trigger 214 to the POVC transitioner 220. In some implementations, the transition trigger 214 operates as a request to transition from presenting a first type of environment to presenting a second type of environment. In some implementations, the transition trigger 214 is based on the user request 212. For example, the data obtainer 210 generates the transition trigger 214 based on an explicit request from the user 12 to switch from displaying an MR environment to displaying a VR environment. Alternatively, in some implementations, the data obtainer 210 automatically determines the transition trigger 214. For example, the data obtainer 210 may automatically determine to switch from presenting a first type of environment to presenting a second type of environment. As an example, the data obtainer 210 may automatically determine to switch from the MR environment to the VR environment in response to detecting that a user interest in viewing a pass-through of the physical environment is less than an MR viewing interest threshold and/or a user interest in viewing the VR environment is greater than a VR viewing interest threshold.

In various implementations, the POVC transitioner 220 determines transition parameters 222 for the transition from the first type of environment to the second type of environment. In some implementations, the transition parameters 222 include a threshold amount of time 222a associated with the transition from the first type of environment to the second type of environment. In some implementations, the transition parameters 222 include transitional POVC values 222b (e.g., the MR POVC values 50, the intermediary POVC values 60 and the VR POVC values 70 shown in FIG. 1A, the POVC values shown in FIG. 1D, or the POVC values shown in FIG. 1E).

In some implementations, the threshold amount of time 222a indicates a time duration associated with the transition from the first type of environment to the second type of environment (e.g., an amount of time that passes between displaying an MR environment and a VR environment when transitioning from the MR environment to the VR environment). In some implementations, the threshold amount of time 222a indicates a time duration for displaying an intermediary environment 232 (e.g., the intermediary environment 90 shown in FIG. 1B) when transitioning from the first type of environment to the second type of environment. In some implementations, the threshold amount of time 222a specifies an amount of time that the POVC adjustment system 200 takes to gradually transition from the intermediary environment 232 to a target environment 234 (e.g., the VR environment 100 shown in FIG. 1C when transitioning from the MR environment 30 to the VR environment 100).

In various implementations, the threshold amount of time 222a is a function of the contextual data that the data obtainer 210 obtains. For example, the POVC transitioner 220 can elongate or shorten the threshold amount of time 222a from a default amount of time based on the contextual data obtained by the data obtainer 210. As discussed in relation to FIG. 1F, in some implementations, the POVC transitioner 220 shortens the threshold amount of time 222a when the head movement data 150 indicates that a head of the user 12 is moving in the same direction as the correction. As such, when the head movement is in the same direction as the correction, the transition between different POVC values may be accelerated. As discussed in relation to FIG. 1G, in some implementations, the POVC transitioner 220 shortens the threshold amount of time 222a when the eye tracking data 160 indicates that the user 12 is blinking. As such, the transition between different POVC values can be accelerated while the user's eyes are closed. As discussed in relation to FIG. 1H, in some implementations, the POVC transitioner 220 elongates the threshold amount of time 222a when the device usage data 170 indicates that an accessibility mode has been activated. As such, the transition between different POVC values may be decelerated in order to make the transition less noticeable for a user with a potential impairment.

In various implementations, the environment presenter 230 presents the intermediary environment 232 (e.g., the intermediary environment 90 shown in FIG. 1B) in accordance with the transitional POVC values 222b (e.g., in accordance with the intermediary POVC values 60 shown in FIG. 1A). In some implementations, the environment presenter 230 presents the intermediary environment 232 for an amount of time indicated by the threshold amount of time 222a. The environment presenter 230 gradually transitions from displaying the intermediary environment 232 to the target environment 234. In some implementations, the target environment 234 includes a VR environment 234a (e.g., the VR environment 100 shown in FIG. 1C) when the electronic device 20 is transitioning from MR to VR. In some implementations, the target environment 234 includes an MR environment 234b (e.g., the MR environment 30 shown in FIG. 1C) when the electronic device 20 is transitioning from VR to MR. In some implementations, the gradual transition from the intermediary environment 232 to the target environment 234 takes an amount of time indicated by the threshold amount of time 222a. In various implementations, the gradual transition from the intermediary environment 232 to the target environment 234 includes changing the level of POVC in accordance with the transitional POVC values 222b.

FIG. 3 is a flowchart representation of a method 300 for transitioning between presenting different types of environments. In various implementations, the method 300 is performed by the electronic device 20 shown in FIGS. 1A-1C and/or the POVC adjustment system 200 shown in FIGS. 1A-2. In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes presenting a first environment (e.g., a mixed reality (MR) environment) with partial point-of-view correction (POVC) (e.g., a first level of POVC). For example, as shown in FIG. 1A, the electronic device 20 presents the MR environment 30 and the POVC adjustment system 200 performs perspective correction in accordance with the MR POVC values 50 to content associated with the MR environment 30 (e.g., to representations of the first physical object 32 and the second physical object 34 depicted in the MR environment 30). In some implementations, the partial POVC includes less than full POVC in at least one axis. In some implementations, the partial POVC includes full POVC in a first axis (e.g., full POVC in the X axis as denoted by the MR X axis POVC value 52 shown in FIG. 1A), no POVC in a second axis (e.g., no POVC in the Y axis as denoted by the MR Y axis POVC value 54), and full POVC in a third axis (e.g., full POVC in the Z axis as denoted by the MR Z axis POVC value 56). In some implementations, the MR environment includes representations of physical objects in a physical environment of the device (e.g., the first physical object 32 and the second physical object 34 shown in FIG. 1A).

As represented by block 320, in some implementations, the method 300 includes determining to transition from the second environment with the partial POVC to a second environment (e.g., a virtual reality (VR) environment) with full POVC (e.g., a second level of POVC that is greater than the first level of POVC). For example, the device determines to switch presenting the MR environment with partial POVC to presenting the VR environment with full POVC. In some implementations, the determination to transition is based on a user request (e.g., the user request 212 shown in FIG. 2). Alternatively, in some implementations, the determination to transition is an automatic determination made by the device without an explicit request from the user to transition from the MR environment to the VR environment. For example, the device determines to transition to the VR environment based on a user interest in viewing the VR environment being greater than a user interest in viewing the MR environment. As another example, the device determines to transition to the VR environment based on an appearance of a virtual object being better than an appearance of the virtual object in the MR environment.

As represented by block 330, in some implementations, the method 300 includes presenting, for a threshold amount of time, an intermediary environment with intermediate POVC that is a function of the partial POVC and the full POVC (e.g., a third level of POVC that is a function of the first level of POVC and the second level of POVC). For example, as shown in FIG. 1B, the electronic device 20 presents the intermediary environment 90 when transitioning from the MR environment 30 shown in FIG. 1A to the VR environment 100 shown in FIG. 1C. Moreover, as illustrated in FIG. 1B, the POVC adjustment system 200 presents the intermediary environment 90 by performing perspective correction in accordance with the intermediary POVC values 60. As another example, as described in relation to FIG. 2, the environment presenter 230 presents the intermediary environment 232 for the threshold amount of time 222a prior to presenting the target environment 234. In various implementations, presenting the intermediary environment with the intermediate POVC tends to reduce a discomfort that may be caused due to an abrupt change from the partial POVC in the MR environment to the full POVC in the VR environment.

As represented by block 330a, in some implementations, transitioning from the partial POVC to the full POVC includes increasing an amount of POVC in a first axis while maintaining an amount of POVC in a second axis. For example, as shown in FIG. 1B, the POVC adjustment system 200 increases the POVC in the Y axis from 0 to 0.5 while maintaining the POVC in the X axis at full POVC (e.g., at 1.0). In some implementations, transitioning from the partial POVC to the full POVC further includes decreasing an amount of POVC in a third axis while increasing the amount of POVC in the first axis and maintaining the amount of POVC in the second axis. For example, as shown in FIG. 1B, the POVC adjustment system 200 decreases the POVC in the Z axis from 1.0 to 0.5 while maintaining the POVC in the X axis at 1.0. In some implementations, temporarily decreasing the POVC in the third axis allows the device to mask (e.g., reduce a noticeability of) the increase in the POVC in the first axis thereby reducing potential discomfort caused due to changes in the POVC in a single axis.

As represented by block 330b, in some implementations, the partial POVC includes full POVC in an X axis, no POVC in a Y axis, and full POVC in a Z axis (e.g., full X, 0 Y, full Z). For example, as shown in FIGS. 1A-1C, the MR POVC values 50 includes full POVC in the X axis, no POVC in the Y axis and full POVC in the Z axis. In some implementations, the full POVC includes full POVC in the X axis, full POVC in the Y axis and full POVC in the Z axis (e.g., full X, full y, full z). For example, as shown in FIGS. 1A-1C, the VR POVC values 70 include full POVC in the X axis, the Y axis and the Z axis. In some implementations, the intermediate POVC includes full POVC in the X axis, partial POVC in the Y axis, and partial POVC in the Z (e.g., full X, 0.5 y, 0.5 z). For example, as shown in FIGS. 1A-1C, the intermediary POVC values 60 includes full POVC in the X axis, partial POVC in the Y axis and partial POVC in the Z axis.

In some implementations, presenting the intermediary environment includes simultaneously decreasing the POVC in the Z axis from full POVC to partial POVC and increasing the POVC in the Y axis from no POVC to partial POVC. For example, as shown in FIGS. 1A-1B, the POVC adjustment system 200 decreases the POVC in the Z axis from the MR Z axis POVC value 56 to the intermediary Z axis POVC value 66 while increasing the POVC in the Y axis from the MR Y axis POVC value 54 to the intermediary Y axis POVC value 64. In some implementations, transitioning from the intermediary environment to the VR environment includes simultaneously increasing the POVC in the Z axis and the Y axis from partial POVC to full POVC. For example, as shown in FIGS. 1B-1C, the POVC adjustment system 200 increases the POVC in the Z axis from the intermediary Z axis POVC value 66 to the VR Z axis POVC value 76 while increasing the POVC in the Y axis from the intermediary Y axis POVC value 64 to the VR Y axis POVC value 74.

As represented by block 330c, in some implementations, the partial POVC includes full POVC in an X axis, no POVC in a Y axis, and no POVC in a Z axis (e.g., full X, 0 Y, 0 Z). In some implementations, the full POVC includes full POVC in the X axis, full POVC in the Y axis and full POVC in the Z axis (e.g., full X, full y, full z). In some implementations, the intermediate POVC includes full POVC in the X axis, partial POVC in the Y axis, and partial POVC in the Z (e.g., full X, 0.5 y, 0.5 z). In such implementations, presenting the intermediary environment includes simultaneously increasing the POVC in the Z axis and the Y axis from no POVC to partial POVC. For example, simultaneously increasing the POVC in the Y axis and the Z axis from 0 to 0.5. In such implementations, transitioning from the intermediary environment to the VR environment includes simultaneously increasing the POVC in the Z axis and the Y axis from partial POVC to full POVC. For example, simultaneously increasing the POVC in the Y axis and the Z axis from 0.5 to 1.0.

As represented by block 330d, in some implementations, presenting the intermediary environment with the intermediate POVC for the threshold amount of time prevents an abrupt transition from the partial POVC to the full POVC. Preventing abrupt transitions between respective perspective corrections associated with MR and VR tends to reduce discomfort associated with switching between MR and VR, for example, by reducing a likelihood of the user feeling dizzy due to sudden changes in the perspective corrections being applied to displayed content. As such, presenting the intermediary environment tends to enhance a user experience provided by the device. In some implementations, presenting the intermediary environment allows the user to use the device for a prolonged period of time thereby increasing a utility of the device.

As represented by block 340, in various implementations, the method 300 includes after presenting the intermediary environment for the threshold amount of time, transitioning from the intermediary environment with the intermediate POVC to the VR environment with the full POVC. For example, as shown in FIGS. 1B-IC, the electronic device 20 transitions from presenting the intermediary environment 90 shown in FIG. 1B to presenting the VR environment 100 shown in FIG. 1C. As another example, as shown in FIG. 2, the environment presenter 230 transitions to presenting the target environment 234 from the intermediary environment 232.

As represented by block 340a, in some implementations, transitioning from the intermediary environment to the VR environment includes displaying a gradual transition from the intermediate POVC to the full POVC. For example, as described in relation to FIGS. 1B and 1C, the POVC adjustment system 200 gradually adjusts the POVC from the intermediary POVC values 60 to the VR POVC values 70. As another example, as described in relation to FIG. 2, the environment presenter 230 gradually transitions from the intermediary environment 232 to the target environment 234 over the threshold amount of time 222a in order to provide a smooth transition (e.g., instead of an abrupt change that may cause discomfort to the user).

As represented by block 340b, in some implementations, transitioning from the intermediary environment to the VR environment includes displaying an angled zoom effect. More generally, in various implementations, transitioning from the intermediary environment to the VR environment results in a zoom effect when the partial POVC includes full POVC in a Z axis, the intermediate POVC includes partial POVC in the Z axis and the full POVC includes full POVC in the Z axis. For example, as illustrated in FIGS. 1A-1C, temporarily reducing the POVC in the Z axis provides an appearance of the zoom effect. While FIGS. 1A-1C illustrate a reduction in the POVC in the Z axis from 1.0 to 0.5, other degrees of reduction are also contemplated. For example, the device can reduce the POVC in the Z axis from 1 to 0.75, and subsequently increase the POVC in the Z axis from 0.75 to 1.

As represented by block 340c, in some implementations, the method 300 includes detecting a head motion of a user of the electronic device, and accelerating the transition from the intermediary environment with the intermediate POVC to the VR environment with the full POVC when the head motion is in a direction of a correction. For example, as described in relation to FIG. 1F, if the user is looking down and is expected to look up, the POVC adjustment system 200 may increase the POVC in the Y axis from 0 to 1 at an accelerated rate. As such, in some implementations, an amount of time associated with transitioning between MR and VR is a function of a head movement of the user.

In some implementations, the method 300 includes detecting that a user of the electronic device is blinking, and accelerating the transition from the intermediary environment with the intermediate POVC to the VR environment with the full POVC in response to detecting that the user is blinking. For example, as described in relation to FIG. 1G, if the user is blinking, the POVC adjustment system 200 may increase the POVC in the Y axis from 0 to 1 at an accelerated rate. As such, in some implementations, an amount of time associated with transitioning between MR and VR is a function of an eye blinking rate of the user.

In some implementations, the method 300 includes determining that an accessibility mode has been activated, and extending a time duration associated with the transitioning from the intermediary environment with the intermediate POVC to the VR environment with the full POVC in response to detecting that the accessibility mode has been activated. For example, as described in relation to FIG. 1H, if accessibility mode has been activated, the POVC adjustment system 200 may elongate a duration of the transition in order to reduce discomfort for a user with an impairment. For example, the transitions between MR and VR may take 30 seconds for a user without an impairment and one minute for a user with an impairment.

As represented by block 340d, in some implementations, the method 300 includes, while presenting the VR environment with the full POVC, determining to transition from the VR environment to the MR environment with the partial POVC. In some implementations, the method 300 includes presenting, for the threshold amount of time, another instance of the intermediary environment with the intermediate POVC that is a function of the partial POVC and the full POVC. For example, as shown in FIG. 1E, the intermediary POVC values 130 indicate temporarily reducing the POVC in the Z axis from 1.0 to 0.75. More generally, in some implementations, presenting the other instance of the intermediary environment includes maintaining full POVC in a first axis, lowering full POVC to partial POVC in a second axis and lowering full POVC to partial POVC in a third axis. In some implementations, the method 300 includes after presenting the intermediary environment for the threshold amount of time, transitioning from the intermediary environment with the intermediate POVC to the MR environment with the partial POVC. For example, with reference to FIG. 1E, the POVC adjustment system 200 restores the POVC in the Z axis from 0.75 to 1.0 while reducing the POVC in the Y axis to 0.0. More generally, in some implementations, transitioning from the intermediary environment to the MR environment includes maintaining the full POVC in the first axis, increasing the partial POVC to full POVC in the second axis and lowering the partial POVC to no POVC in the third axis.

Figure 4:
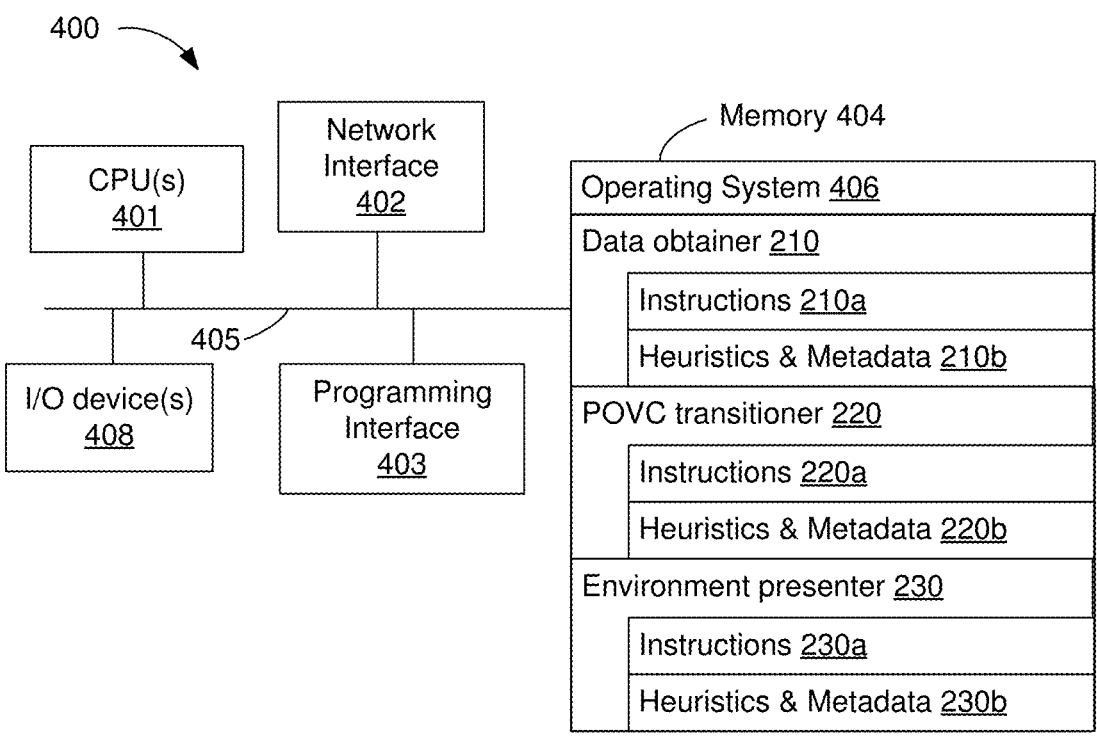
FIG. 4 is a block diagram of a device that transitions between environments that are associated with different perspective corrections in accordance with some implementations.

FIG. 4 is a block diagram of a device 400 in accordance with some implementations. In some implementations, the device 400 implements the electronic device 20 shown in FIGS. 1A-1C and/or the POVC adjustment system 200 shown in FIGS. 1A-2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 408, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the one or more I/O devices 408 include a display (e.g., the display 22 shown in FIG. 1A). In some implementations, the display includes an extended reality (XR) display. In some implementations, the one or more I/O devices 408 include an image sensor. The image sensor may include a visible light camera and/or an infrared light camera for capturing image data.

In some implementations, the memory 404 or the non-transitory computer readable storage medium of the memory 404 stores the following programs, modules and data structures, or a subset thereof including an optional operating system 406, the data obtainer 210, the POVC transitioner 220 and the environment presenter 230.

In various implementations, the data obtainer 210 includes instructions 210a, and heuristics and metadata 210b for obtaining a request to switch between MR and VR (e.g., the user request 212 shown in FIG. 2). In some implementations, the POVC transitioner 220 includes instructions 220a, and heuristics and metadata 220b for determining transition parameters for transitions between MR and VR (e.g., the POVC values shown in FIGS. 1A-1E, and/or the transition parameters 222 shown in FIG. 2) In some implementations, the environment presenter 230 includes instructions 230a, and heuristics and metadata 230b for presenting an intermediary environment (e.g., the intermediary environment 90 shown in FIG. 1B and/or the intermediary environment 232 shown in FIG. 2) and displaying a gradual transition from the intermediary environment to a target environment (e.g., the VR environment 100 shown in FIG. 1C and/or the target environment 234 shown in FIG. 2).

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

FIG. 5 is a flowchart representation of a method 500 for transitioning between different perspectives. In various implementations, the method 500 is performed by the electronic device 20 shown in FIGS. 1A-1C and/or the POVC adjustment system 200 shown in FIGS. 1A-2. In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 510, in various implementations, the method 500 includes capturing, via the image sensor, an image of a physical environment from a first perspective of the image sensor. In some implementations, the first perspective of the image sensor is different from a second perspective of an eye of a user of the electronic device. For example, referring to FIG. 1A, the electronic device 20 captures an image of the physical environment 10 via a camera of the electronic device 20. In some implementations, the image sensor is offset from a location of the eye of the user. For example, the image sensor may be closer to an object being photographed than the eye of the user. The offset may be in a single axis (e.g., just a Z axis). Alternatively, the offset may be in multiple axis (e.g., in an X axis, a Y axis and a Z axis).

As represented by block 520, in various implementations, the method 500 includes presenting a mixed reality (MR) environment by transforming the image from the first perspective to a third perspective that is between the first perspective and the second perspective. For example, referring to FIG. 1A, in some implementations, the electronic device 20 (e.g., the POVC adjustment system 200) presents the MR environment 30 by transforming an image captured by a camera of the electronic device 20.

As represented by block 530, in some implementations, the method 500 includes determining to transition from the MR environment being presented from the third perspective to a virtual reality (VR) environment to be presented from the second perspective. For example, referring to FIGS. 1A-1C, the electronic device 20 determines to transition from the MR environment 30 shown in FIG. 1A to the VR environment 100 shown in FIG. 1C.

As represented by block 540, in some implementations, the method 500 includes presenting, for a threshold amount of time, an intermediary environment from a fourth perspective that is a function of the third perspective of the MR environment and the second perspective of the VR environment. For example, as shown in FIG. 1B, the electronic device 20 presents the intermediary environment 90 in accordance with the intermediary POVC values 60.

As represented by block 550, in some implementations, the method 500 includes, after presenting the intermediary environment for the threshold amount of time, transitioning from the intermediary environment with the fourth perspective to the VR environment with the second perspective. For example, as shown in FIG. 1C, the electronic device 20 presents the VR environment 100 in accordance with the VR POVC values 70.

In some implementations, transforming the image from the first perspective to the third perspective includes performing full point-of-view correction (POVC) in an X axis, no POVC in a Y axis and full POVC in a Z axis. For example, referring to FIG. 1A, the electronic device 20 (e.g., the POVC adjustment system 200) presents the MR environment 30 by performing a perspective correction in an X axis in accordance with the MR X axis POVC value 52 and by performing a perspective correction in a Z axis in accordance with the MR Z axis POVC value 56 while not performing perspective correction in a Y axis in accordance with the MR Y axis value 54.

In some implementations, presenting the intermediary environment from the fourth perspective includes continuing to perform full POVC in the X axis, increasing from no POVC to partial POVC in the Y axis, and reducing from full POVC to partial POVC in the Z axis. For example, as shown in FIG. 1B, the electronic device 20 presents the intermediary environment 90 where the POVC adjustment system 200 performs full POVC in the X axis in accordance with intermediary X axis POVC value 62, starts performing perspective correction in the Y axis in accordance with the intermediary Y axis POVC value 64, and reduces perspective correction in the Z axis in accordance with the intermediary Z axis POVC value 66.

In some implementations, transitioning from the intermediary environment with the fourth perspective to the VR environment with the second perspective includes continuing to perform full POVC in the X axis, increasing from partial POVC to full POVC in the Y axis, and increasing from partial POVC to full POVC in the Z axis. For example, as shown in FIG. 1C, the electronic device 20 presents the VR environment 100 where the POVC adjustment system 200 performs full POVC in the X axis in accordance with VR X axis POVC value 72, full POVC in the Y axis in accordance with the VR Y axis POVC value 74, and full perspective correction in the Z axis in accordance with the VR Z axis POVC value 76.

In some implementations, an amount of time for transitioning from the intermediary environment with the fourth perspective to the VR environment with the second perspective is a function of a head motion of the user. For example, as shown in FIG. 1F, the POVC adjustment system 200 can accelerate the transition when a head motion is in a direction of the correction.

In some implementations, an amount of time for transitioning from the intermediary environment with the fourth perspective to the VR environment with the second perspective is a function of a blink rate of the eye. For example, as shown in FIG. 1G, the POVC adjustment system 200 can accelerate the transition when the user is blinking.

In some implementations, an amount of time for transitioning from the intermediary environment with the fourth perspective to the VR environment with the second perspective is a function of a mode of operation of the electronic device. For example, as shown in FIG. 1H, the POVC adjustment system 200 can decelerate the transition when an accessibility mode has been activated.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
  at an electronic device including a non-transitory memory, one or more processors, a display and an image sensor:
    presenting a first environment with partial point-of-view correction (POVC), wherein presenting the first environment with the partial POVC comprises:
    capturing, by the image sensor, an image from a first perspective of the image sensor, wherein the first perspective is different from a second perspective of an eye of a user of the electronic device; and
    transforming the image from the first perspective to a third perspective that is between the first perspective and the second perspective;
    determining to transition from the first environment with the partial POVC to a second environment with full POVC;
    presenting, for a threshold amount of time, an intermediary environment with intermediate POVC that is a function of the partial POVC and the full POVC; and
    after presenting the intermediary environment for the threshold amount of time, transitioning from the intermediary environment with the intermediate POVC to the second environment with the full POVC.

2. The method of claim 1, wherein presenting the intermediary environment with the intermediate POVC includes increasing an amount of POVC in a first axis while maintaining an amount of POVC in a second axis.

3. The method of claim 2, wherein presenting the intermediary environment with the intermediate POVC further includes decreasing an amount of POVC in a third axis while increasing the amount of POVC in the first axis and maintaining the amount of POVC in the second axis.

4. The method of claim 1, wherein the partial POVC of the first environment includes full POVC in an X axis, no POVC in a Y axis, and full POVC in a Z axis;
  wherein the full POVC of the second environment includes full POVC in the X axis, full POVC in the Y axis and full POVC in the Z axis; and
  wherein the intermediate POVC of the intermediary environment includes full POVC in the X axis, partial POVC in the Y axis, and partial POVC in the Z axis.

5. The method of claim 4, wherein presenting the intermediary environment includes simultaneously decreasing from full POVC to partial POVC in the Z axis and increasing from no POVC to partial POVC in the Y axis; and
  wherein transitioning from the intermediary environment to the second environment includes simultaneously increasing from partial POVC to full POVC in the Z axis and the Y axis.

6. The method of claim 1, wherein the partial POVC of the first environment includes full POVC in an X axis, no POVC in a Y axis, and no POVC in a Z axis;

wherein the full POVC of the second environment includes full POVC in the X axis, full POVC in the Y axis and full POVC in the Z axis; and
  wherein the intermediate POVC includes full POVC in the X axis, partial POVC in the Y axis, and partial POVC in the Z axis.

7. The method of claim 6, wherein presenting the intermediary environment includes simultaneously increasing from no POVC to partial POVC in the Z axis and the Y axis; and
  wherein transitioning from the intermediary environment to the second environment includes simultaneously increasing from partial POVC to full POVC in the Z axis and the Y axis.

8. The method of claim 1, wherein transitioning from the intermediary environment to the second environment includes displaying a gradual transition from the intermediate POVC to the full POVC.

9. The method of claim 1, wherein transitioning from the intermediary environment to the second environment includes displaying an angled zoom effect.

10. The method of claim 1, wherein transitioning from the intermediary environment to the second environment results in a zoom effect when the partial POVC includes full POVC in a Z axis, the intermediate POVC includes partial POVC in the Z axis and the full POVC includes full POVC in the Z axis.

11. The method of claim 1, wherein presenting the intermediary environment with the intermediate POVC for the threshold amount of time prevents an abrupt transition from the partial POVC to the full POVC.

12. The method of claim 1, further comprising:
  detecting a head motion of a user of the electronic device; and
  accelerating the transitioning from the intermediary environment with the intermediate POVC to the second environment with the full POVC when the head motion is in a direction of a correction.

13. The method of claim 1, further comprising:
  detecting that a user of the electronic device is blinking; and
  accelerating the transitioning from the intermediary environment with the intermediate POVC to the second environment with the full POVC in response to detecting that the user is blinking.

14. The method of claim 1, further comprising:
  determining that an accessibility mode has been activated; and
  extending a time duration associated with the transitioning from the intermediary environment with the intermediate POVC to the second environment with the full POVC in response to detecting that the accessibility mode has been activated.

15. The method of claim 1, further comprising:
  while presenting the second environment with the full POVC, determining to transition from the second environment to the first environment with the partial POVC;
  presenting, for the threshold amount of time, another instance of the intermediary environment with the intermediate POVC that is a function of the partial POVC and the full POVC; and
  after presenting the intermediary environment for the threshold amount of time, transitioning from the intermediary environment with the intermediate POVC to the first environment with the partial POVC.

16. The method of claim 15, wherein presenting the other instance of the intermediary environment includes maintaining full POVC in a first axis, lowering full POVC to partial POVC in a second axis and lowering full POVC to partial POVC in a third axis; and wherein transitioning from the intermediary environment to the first environment includes maintaining the full POVC in the first axis, increasing the partial POVC to full POVC in the second axis and lowering the partial POVC to no POVC in the third axis.

17. The method of claim 1, wherein the first environment includes a mixed reality (MR) environment and the second environment includes a virtual reality (VR) environment.

18. A device comprising:

a display;

an image sensor;

one or more processors;

a non-transitory memory; and one or more programs stored in the non-transitory memory, which, when executed by the one or more processors, cause the device to:

present a first environment with partial point-of-view correction (POVC), wherein presenting the first environment with the partial POVC comprises:

capturing, by the image sensor, an image from a first perspective of the image sensor, wherein the first perspective is different from a second perspective of an eye of a user of the device; and transforming the image from the first perspective to a third perspective that is between the first perspective and the second perspective;

determine to transition from the first environment with the partial POVC to a second environment with full POVC;

present, for a threshold amount of time, an intermediary environment with intermediate POVC that is a function of the partial POVC and the full POVC; and after presenting the intermediary environment for the threshold amount of time, transition from the intermediary environment with the intermediate POVC to the second environment with the full POVC.

19. The device of claim 18, wherein presenting the intermediary environment with the intermediate POVC for the threshold amount of time prevents an abrupt transition from the partial POVC to the full POVC.

20. A non-transitory memory storing one or more programs, which, when executed by one or more processors of a device with a display and an image sensor, cause the device to:

present a first environment with partial point-of-view correction (POVC);

determine to transition from the first environment with the partial POVC to a second environment with full POVC;

present, for a threshold amount of time, an intermediary environment with intermediate POVC that is a function of the partial POVC and the full POVC; and after presenting the intermediary environment for the threshold amount of time, transition from the intermediary environment with the intermediate POVC to the second environment with the full POVC, wherein presenting the intermediary environment with the intermediate POVC for the threshold amount of time prevents an abrupt transition from the partial POVC to the full POVC.

* * * * *